(12) United States Patent
Corcoran et al.

(10) Patent No.: US 6,432,484 B1
(45) Date of Patent: Aug. 13, 2002

(54) COATING COMPOSITIONS CONTAINING HIGHLY STRUCTURED MACROMOLECULES

(75) Inventors: Patrick Henry Corcoran, Cherry Hill, NJ (US); Carl Brent Douglas, Boothwyn, PA (US); Eric Diaz Felton, Newark, DE (US); Josef Huybrechts, Oud-Turnhout (BE); Gary Delmar Jaycox, West Chester, PA (US); Patricia Mary Ellen Sormani, Newark, DE (US); Marko Strukelj, Wilmington, DE (US); Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/744,101

(22) PCT Filed: May 2, 2000

(86) PCT No.: PCT/US00/11794

§ 371 (c)(1), (2), (4) Date: Jan. 16, 2001

(87) PCT Pub. No.: WO00/68331

PCT Pub. Date: Nov. 16, 2000

Related U.S. Application Data

(60) Provisional application No. 60/132,624, filed on May 5, 1999.

(51) Int. Cl.⁷ .................................................. B05D 7/00
(52) U.S. Cl. ...................................... 427/385.5; 525/190
(58) Field of Search ......................... 525/190; 427/385.5

(56) References Cited

U.S. PATENT DOCUMENTS

| | | | |
|---|---|---|---|
| 3,668,183 A | * | 6/1972 | Hoy et al. ..................... 260/65 |
| 4,772,680 A | | 9/1988 | Noomen et al. |
| 5,288,802 A | | 2/1994 | Walters et al. |
| 5,332,785 A | | 7/1994 | Brindoepke |
| 5,426,148 A | | 6/1995 | Tucker |
| 5,459,178 A | * | 10/1995 | Chan et al. .................. 523/139 |

FOREIGN PATENT DOCUMENTS

| | | |
|---|---|---|
| DE | 19620351 A | 11/1997 |
| EP | 0483915 A | 5/1992 |
| EP | 0603716 A | 6/1994 |
| WO | WO 9421738 A | 9/1994 |
| WO | WO 9960065 A | 11/1999 |
| WO | WO 00/31196 | 6/2000 |

OTHER PUBLICATIONS

Turner Et Al., Hyperbanched Polymers, Polymer News, 1997, vol. 22, pp. 197–202.
Kim, Highly Branched Polymers, Polymeric Materials Encyclopedia, vol. 5, pp. 3049–3053, 1996.
Hult et al., Hyperbranched Aliphatic Polyesters, Polymeric Materials Encyclopedia, vol. 5, pp. 3171–3176, 1996.
Voit et al., Hyperbranched Polyesters, Polymeric Materials Encyclopedia, vol. 5, pp. 3177–3185, 1996.
Huybrechts Et Al., Star Oligomers for Low VOC Polyurethane Coatings, Surface Coatings International (1998) (3), pp. 117–127.

* cited by examiner

*Primary Examiner*—Erma Cameron
(74) *Attorney, Agent, or Firm*—Sudhir G. Deshmukh

(57) ABSTRACT

The invention is directed to a two-pack high solids low VOC ambient curable coating composition, which includes cross linking and binder components. The crosslinking component includes a polyamine, a polyketimine, or a combination thereof. The polyamine is provided on an average with at least two amine functionalities per polymer chain and the polyketimine is provided on an average with at least two ketimine functionalities per polymer chain. A reactive diluent in the binder component includes a macromolecule substantially free from acrylate functionalities and having at least two acetoacetate functionalities per the macromolecule. If desired, the coating composition includes a binder polymer. The coating composition of the invention is particularly suited in automotive refinish coatings.

20 Claims, No Drawings

COATING COMPOSITIONS CONTAINING HIGHLY STRUCTURED MACROMOLECULES

This application is a §371 of PCT/US00/11794 filed on May 2, 2000, which claims the benefit of U.S. Provisional Application 60/132,624 filed on May 5, 1999.

BACKGROUND OF THE INVENTION

The present invention relates to curable compositions and more particularly to low VOC (volatile organic component) ambient temperature curable coating compositions suitable for use in automotive refinish applications. A number of clear and pigmented coating compositions are utilized in various coatings, such as, for example, primers, basecoats and clearcoats used in automotive refinish coatings, which are generally solvent based.

In repairing damage, such as dents and scratches to autobodies, the original coating in and around the damaged area is typically sanded or ground out by mechanical means. Some times the original coating is stripped off from a portion or off the entire autobody to expose the substrate (e.g., bare metal) underneath. After repairing the damage, the repaired surface is coated, preferably with low VOC coating compositions, typically in portable or permanent low cost painting enclosures vented to the atmosphere to remove the organic solvents from the freshly applied paint coatings in an environmentally safe manner. Generally, the drying and curing of the freshly applied paint takes place within these enclosures. Furthermore, it is preferable to conduct the foregoing drying and curing steps within the enclosure to prevent the wet paint from collecting dirt in the air or other contaminants.

As these paint enclosures take up significant floor space of typical small autobody paint repair shops, these shops prefer to dry and cure these paints as rapidly as possible. More expensive enclosures are frequently provided with heat sources, such as conventional heat or infrared lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for low VOC fast curing coating formulations which cure under ambient conditions while still providing outstanding performance characteristics such as solvent resistance One of the approaches used in addressing the foregoing involves utilizing a binder system that contains a conventional polyester resin functionalized with acetoacetate groups and having at least two acrylate moieties. However, the use of acrylate functionalities, such as those disclosed in U.S. Pat. No. 5,288,802, is not the best approach, if rapid cure coatings are desired. Thus, a continuing need still exists for a low VOC coating composition that cures rapidly under ambient conditions.

Another disadvantage of the compositions described in U.S. Pat. No. 5,288,802 is the disagreeable and offensive odor associated with acrylate functionalized diluents used in these compositions.

Thus, it would be most advantageous to provide a composition that not only cures more rapidly than current undercoatings of this type to permit autobody paint repair shops to rapidly complete the repairs, but also has less offensive odors.

STATEMENT OF THE INVENTION

The present invention is directed to a coating composition comprising:

a crosslinking component comprising a polyamine, a polyketimine, or a combination thereof, wherein said polyamine has an average of at least two amine functionalities per polyamine molecule and wherein said polyketimine has an average of at least two ketiniine functionalities per polyketimine molecule; and a binder component comprising:

at least one structured reactive diluent having a GPC weight average molecular weight in the range of from 100 to 45,000, said diluent being substantially free from acrylate functionalities and having at least two acetoacetate functionalities per diluent molecule.

The present invention is further directed to a method of producing a coating on a substrate, said method comprising:

mixing a crosslinking component with a binder component to form a pot mix, said crosslinking component comprising a polyamine, a polyketimine, or a combination thereof, said polyamine having an average of at least two amine functionalities per polyamine molecule and said polyketimine having an average of at least two ketimine functionalities per polyketimine molecule; said binder component comprising at least one structured reactive diluent having a GPC weight average molecular weight in the range of from 100 to 45,000, said diluent being substantially free from acrylate functionalities and having at least two acetoacetate functionalities per said diluent molecule;

applying a layer of said pot mix on said surface; and curing said layer under ambient conditions to form said coating on said surface of said substrate.

One of the advantages of the present invention is its low VOC, which is significantly below the current guidelines of Environment Protection Agency (EPA) of the United States.

Another advantage of the composition of the present invention is that it is free from isocyanate groups. As a result, it has less toxicity than conventional isocyanate group-containing coating compositions, such as polyurethanes. This reduced toxicity is particularly helpful for auto paint repair shops that may not have physical facilities required to handle more toxic compositions containing isocyanate functionalities.

Yet another advantage of the composition of the present invention is that it reduces the time-to-sand, before the coating can be sanded without fouling the sandpaper, thereby increasing the number of repairs that could be performed in a day.

Still another advantage of the composition of the present invention is that it does not release pungent odors often associated with low molecular weight compounds containing acrylate functional moieties. Compounds such as these are employed in conventional low VOC non-isocyanate containing coating compositions.

DETAILED DESCRIPTION OF THE INVENTION

As used herein:

"Two-pack coating composition" means a thermosetting composition comprising two components that are stored in separate containers, which are typically sealed for increasing the shelf life of the components of the coating composition. The components are mixed just prior to use to form a pot mix, which has a limited pot life, typically a few minutes, such as 15 minutes to 45 minutes to a few hours, such as 2 hours to 6 hours. The pot mix is applied as a layer of desired thickness on a substrate surface, such as an autobody. After application, the layer dries and cures to form a coating on the substrate surface having desired coating properties, such as solvent resistance.

"Low VOC coating composition" means a coating composition that is less than about 0.6 kilogram of organic solvent per liter (5 pounds per gallon) of the composition, as determined under the procedure provided in ASTM D3960.

"High solids composition" means a coating composition having a solids component of above 30 percent, preferably in the range of from 40 to 95 percent and more preferably in the range of from 45 to 80 percent, all in weight percentages based on the total weight of the composition.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofurane and the standard was polymethyl methacrylate.

"Polydispersity" means GPC weight average molecular weight divided by GPC number average molecular weight.

"Polymer solids" or "Binder solids" means a polymer or binder in its dry state.

"(Meth)acrylate" means acrylate and methacrylate.

"Structured reactive diluent" means a structured molecule, such as a macromolecule, oligomer or polymer, which unlike conventional resins, has a very well defined structure. Examples of these diluents include star, expanded star, dendritic (hyper branched), or cyclodextric structured molecules.

One efficient approach to reduce VOC is to use high solids coating compositions containing low weight average molecular weight, i.e., less than about 10,000, structured reactive diluents functionalized with strategically positioned acetoacetate functional groups. This also has the benefit of significantly increased reactivity and reduced odor relative to acrylate functionalized diluents.

The present invention is directed to a coating composition suited for various coating processes, particularly in automotive refinishing process used for coating autobodies. The composition is a two-pack composition, which includes a crosslinking component and a binder component. The coating composition includes in the range of from 20 percent to 80 percent, preferably in the range of from 30 percent to 70 percent and more preferably in the range of from 40 percent to 65 percent of the crosslinking component, the percentages being in weight percentages based on the total weight of binder and crosslinking components solids.

The crosslinking component includes a polyamine, a polyketimine, or a combination thereof. Polyketimine is preferred. When used as a combination of a polyamine and a polyketimine, the ratio thereof by weight parts is in the range from 1 to 100 through 100 to 1, preferably in the range of from 1 to 50, more preferably in the range of from 1 to 20.

The polyamine has a weight average molecular weight of at least 100, as determined by gel permeation chromatography using polymethyl methacrylate standards. Typically, the GPC weight average molecular weight ranges from about 100 to about 50,000, preferably from about 150 to about 10,000 and more preferably from about 200 to about 5,000.

The polyamine has an average of at least two amine functionalities per molecule, which may be primary, secondary or a combination of secondary and primary amine functionalities. Preferably, the polyamine has an average of from about 2 to about 25 and more preferably, in the range of from about 2 to about 6 amine functionalities per polyamine molecule. These amine functionalities may be present either as pendant functionalities or amine functionalities positioned in the backbone of the polymer chain. Pendent amine functionalities are preferred.

Examples of representative polyamines suitable for use in the invention include aliphatic or cycloaliphatic amines, or a combination thereof The aliphatic polyamine is preferred.

Examples of suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl) methylamine, 3-amino-1-(methylamino) propane, 3-amino-1-(cyclohexylamino)propane, and N-(2-hydroxyethyl)ethylene diamine. Ethylenediamine, propylenediamine, butylenediamine and 1,2-diaminocyclohexane are preferred.

Other suitable polyamines include those of the formula:

where the $R_1$ and $R_2$ groups may be the same or different and represent an alkylene group containing 2 to 6 and preferably 2 to 4 carbon atoms and n is an independently selected number in the range of from 1 to 6 and preferably in the range of from 1 to 3. The alkylene group is a cycloalkylene group or an alkylene group containing an ether-oxygen atom. Examples of representative polyamines containing polyalkylene groups include diethylene triamine, dipropylene triamine and dibutylene triamine. It is preferred that these polyamines should be of a cycloaliphatic nature and contain 5 to 15 carbon atoms, such as isophoronediamine; more particularly containing an alpha-aklyl group, such as bis(3-methyl-4-aminocyclohexyl) methane and bis(3-methyl-4-aminocyclohexyl) propane.

Other suitable polyamines include reaction products of primary or secondary polyamines, such as ethylene diamine and diethylene triamine, with adducts of polyhydroxyls reacted with polyepoxides, polyacrylates, polymethacrylates, polyisocyanates, polyoxides or a combination thereof.

Suitable polyhydroxyls include ethylene glycol, propylene glycol, diethylene glycol, tetramethylene diol, neopentyl glycol, hexamethylene diol, cyclohexane diol, 4,4'-dihydroxybenzophenone, bis-(4-hydroxycyclohexane) methane, glycerol, trimethylol ethane, trimethylol propane, polyvinyl phenol and pentaerythritol.

Some of the suitable polyepoxides include those containing at least two oxirane groups in the molecule, i.e.,

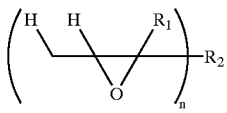

where n is at least two, $R_1$ is hydrogen or methyl, and $R_2$ broadly represents an organic based molecule or polymer typically composed of carbon, hydrogen, oxygen, and optionally nitrogen, sulfur, or both. Hydroxyl substituent groups may also be present, as well as halogen and ether groups. Generally, the epoxide equivalent weight ranges from about 100 to about 1500, preferably from about 100 to about 1200, and more preferably from about 150 to about 600. These polyepoxides can be broadly categorized as being aliphatic, aromatic, cyclic, acyclic, alicyclic or heterocyclic.

Another group of useful polyepoxides for use in the present invention includes epoxy novalac resins. These resins are prepared by reacting an epihalohydrin with the condensation product of an aldehyde with a monohydric or polyhydric phenol. One example is the reaction product of epichlorohydrin with a phenolformaldehyde condensate.

Another particularly preferred group of the polyepoxides are the polyglycidyl ethers of polyhydric aromatic hydroxy compounds, such as for example, dihydric phenols. The phenol must be at least dihydric, such as, for example, resorcinol, catechol, hydroquinone, bis(4-hydroxyphenyl)-1,1-isobutane; 4,4-dihydroxybenzophenone; bis(4-hydroxyphenyl)-1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Preferably bisphenol A is utilized. Of the many polyepoxides possible, the one principally utilized is epichlorohydrin although epibromohydrin is also quite useful. The polyglycidyl ethers especially useful herein are obtained by reacting epichlorohydrin and bisphenol A in the presence of an alkali, such as sodium or potassium hydroxide. The series of epoxy resins sold by Shell Chemical Company under the trademark EPON are especially useful herein.

Another group of useful polyepoxides are the polyglycidyl ethers derived from reacting epihalohydrin, preferably epichlorohydrin, with polyhydric alcohols, such as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the polyepoxides which are polyglycidyl ethers of polycarboxylic acids. These materials are produced by the reaction of an epoxy compound, such as epichlorohydrin with an aliphatic or aromatic polycarboxylic acid such as oxalic acid; succinic acid; glutaric acid; terephthalic acid; 2,6-naphthalene dicarboxylic acid and dimerized linoleic acid.

Still another group of polyepoxides are derived from epoxidation of olefinically unsaturated alicyclic materials. Among these are the epoxy alicyclic ethers and esters, which are well known in the art.

It should be understood that mixtures of the polyepoxides are also useful herein. The preferred epoxy equivalent weight of the polyepoxide(s) is in the range of from 87 to 6000, more particularly the range of from 120 to 1000. Suitable polyoxides include those containing oxyalkylene groups, i.e.,

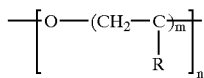

wherein R is hydrogen or $C_1$ to $C_6$ alkyl, m is an integer varying from 1 to 4 and n is an integer varying from 2 to 50. The proportion of oxyalkylene groups in the polyepoxide depends upon a number of factors, among them the size of the oxyalkylene group and the nature of the polyepoxide.

Examples of suitable polyisocyanates include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene a xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation ), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

Examples of suitable polyacrylates or polymethacrylates include polymerized monomers, such as acrylic or methacrylic esters of a mono-, di- or polyfunctional hydroxyl compound including methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobomyl acrylate, oleyl acrylate, glycidyl methacrylate or (meth)acryloxypropyl trimethoxysilane.

The polyketimines which are suitable for use in the present invention are obtained by blocking the amino groups on the aforedescribed polyamines with a blocking agent, such as an aldehyde or ketone having not more than 18 carbon atoms, preferably 3 to 10 carbon atoms. Examples of suitable blocking agents for the amino groups include acetone, diethyl ketone, methylisobutyl ketone, isobutyraldehyde, hydroxybutyraldehyde, pentanone, cyclohexanone, ethylamyl ketone, hydroxycitronellal, isophorone and decanone. An aliphatic or cycloaliphatic ketone is preferred and an aliphatic or cycloaliphatic ketone with 3 to 8 carbon atoms is more preferred.

The binder component of the coating composition includes in the range of from percent 1 percent to 90 percent, preferably in the range of from 5 percent to 80 percent and more preferably in the range of from 20 percent to 60 percent of at least one structured reactive diluent, the percentages being in weight percentages based on the total weight of binder solids. The structured reactive diluent molecule which is substantially free from acrylate functionalities and has at least 2, preferably in the range of from 2 to 30, more preferably in the range of 2 to 25 and still more preferably in the range of 2 to 10 and most preferably in the range of acetoacetate groups. The structured reactive diluent has a GPC weight average molecular weight in the range of from 100 to 45,000, preferably in the range of from 200 to 10,000 and more preferably in the range of from 400 to 5,000. The structured reactive diluent has an acetoacetate equivalent weight (grams/equivalent) from about 100 to about 1000, preferably from about 100 to about 800 and more preferably from about 100 to about 600. The structured reactive diluent has a Tg in the range of from −100° C. to 100° C., preferably in the range of from −80° C. to 50° C. and more preferably in the range of from −70° C. to −30° C.

The "highly ordered" structure of these structured reactive diluents make them dramatically different from conventional polyacrylic or polyester oligomers, which are linear or linear with random branching.

Some of the suitable structured reactive diluents include those produced by reacting a ketene or an acetoacetate compound, such as tert-butylacetoacetate, with a polyol such as, 1,4-cyclohexanedimethanol, ethylene glycol, glycerine, neopentyl glycol, bisphenol A extended with ethylene oxide, trimethylol propane, tris(2-hydroxyethyl)isocyanurate (Theic), caprolactone extended tris(2-hydroxyethyl) isocyanurate, pentaerthyritol, the hexafunctional hydroxyl compound prepared from the bisepoxide Epon® 828 (Bisphenol A and epichlorohydrin) and diethanol amine. The structured reactive diluents may also be prepared by reacting a ketene or an acetoacetate compound, such as tert-butylacetoacetate, with a reaction product of an oligomeric acid, such as dimethylolpropionic acid with a monofunctional epoxide, such as ethylene oxide or a lactone, such as ε-caprolactone. The foregoing structured diluents typically have a star shaped structure having at least 2 arms, preferably 3 to 10 arms. The process for producing the foregoing structural reactive diluents is shown below:

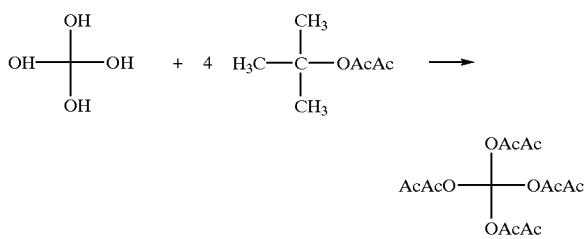

The branches on the star shaped structure described above may be expanded by providing intervening functionalities, which are terminated with hydroxyl functionalities. These terminal hydroxyl functionalities on the star shaped polyols are then reacted with a ketene or tert-butylacetoacetate to provide the structured reactive diluent with the acetoacetate functionalities.

The intervening functionalities on the star shaped polyol described above are provided by an acid anhydride, followed by reaction with an epoxide or a lactone having 5 to 20 carbon atoms, more particularly ε-caprolactone. The formulas below describe some of the details of these reactions:

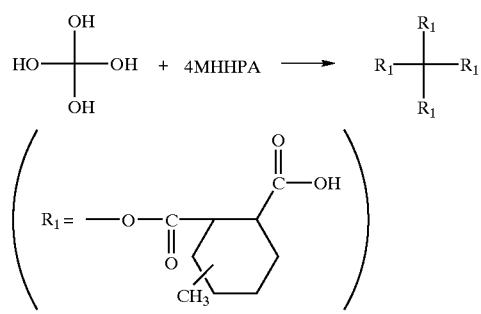

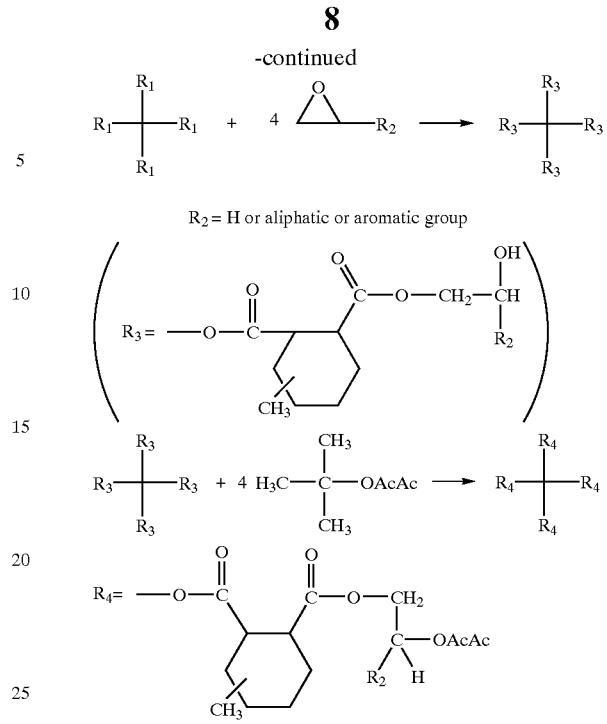

Suitable acid anhydrides include succinic anhydride, maleic anhydride, phthalic anhydride, hexahydrophthalic anhydride, methyl hexahydrophthalic anhydride, (MHHPA), trimellitic anhydride, hydrogenated trimellitic anhydride, the Diels-Alder adduct of maleic anhydride with sorbic acid, and the hydrogenated Diels-Alder adduct of maleic anhydride with sorbic acid. Suitable epoxides include ethylene oxide and monoepoxyesters such as, epoxyesters of benzoic acid, acetic acid, privalic acid (Cardura™ E5), and versatic acid (Cardura™ E4). When a caprolactone is utilized, its percentage should not exceed more than 50 percent by weight, otherwise the resultant coating therefrom becomes too soft. The resulting primary or secondary hydroxyl groups generated by the aforedescribed syntheses are subsequently reacted with an acetoacetate compound, such as tert-butyl acetoacetate, to provide compounds that are capped with acetoacetate moieties. Additional information about the hydroxyl analogues and their unique structures is disclosed in the U.S. Pat. No. 5,753,756 to Aerts et al. and in Star Oligomers for low VOC Polyurethane Coatings by Huybrechts et al., in Surface Coatings International, No. 3, 1998, all of which are incorporated herein by reference.

A structured reactive diluent having expanded convergent or divergent structures may be produced by converging over a simple core provided by the aforedescribed polyols with additional functionalities which are terminated with acetoacetate functionalities or by diverging from a simple core provided by the aforedescribed polyols with additional functionalities which are terminated with acetoacetate functionalities.

Thus, these highly structured reactive diluents possess three distinguishing architectural features: a core, interior layers composed of repeating units attached to the core, and an exterior or terminal acetoacetate functionalities attached to the outermost generation. The outermost hydroxyl functionalities are functionalized with the acetoacetate functionalities to form a structured reactive diluent having an expanded core. The following formulas describe the structural details of these reactive diluents having expanded convergent or divergent structures:

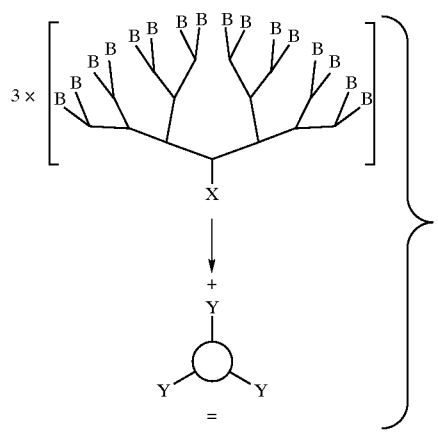

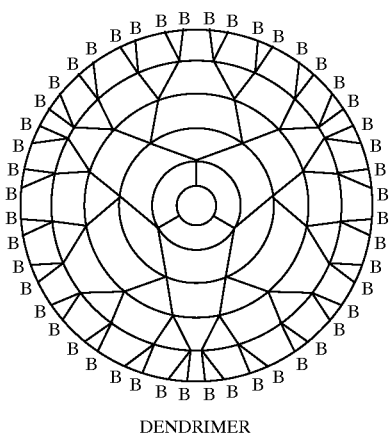

DENDRIMER

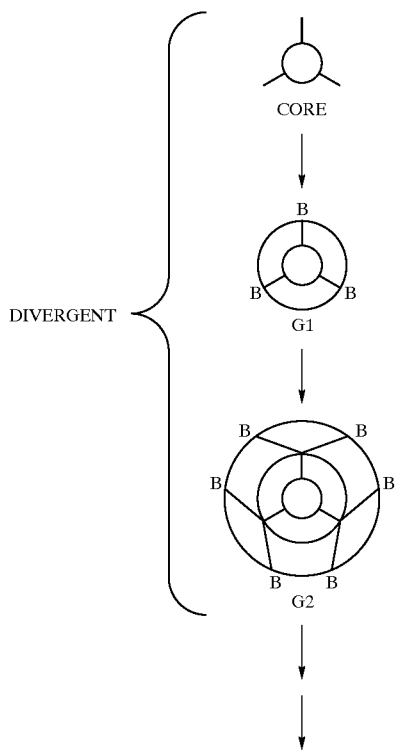

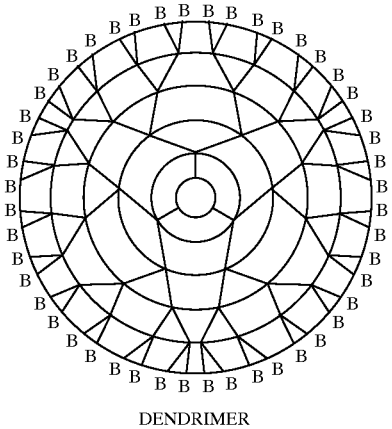

DENDRIMER

Unlike conventional polyesters or polyester oligomers, these expanded-core structured reactive diluent possess a dense, compact structure from many short branches below entanglement molecular weight and therefore, relative to conventional materials these types of structures exhibit reduced viscosity because they are essentially entanglement free. Additional details of these reactive diluents are provided by Hult et al, in *Hyperbranched Aliphatic Polyesters,* Polymeric Materials Encyclopedia, Vol. 5, at page 3171, published by CRC Press, Inc. in 1996; and also by Turner et al. in, *Hyperbranched Polymers,* Polymer News, Vol. 22 at page 197, both of which are incorporated herein by reference.

Still another suitable structured reactive diluent includes dendritic oligomers or polymers having hydroxyl termini that are capped with acetoacetate to form the reactive diluent. These dendritic oligomers or polymers are polymerized from $AB_x$ monomers, wherein A is a hydrocarbyl radical containing a carboxyl acid ($—CO_2H$), carboxyl ester group ($—CO_2R$), or mixture thereof, wherein R is $C_{1-12}$ alky; B is a hydrocarbyl radical containing 1 to 10, prefeably 2 to 3, hydroxyl ($—OH$) or ester group ($—O_2CR'$), wherein R' is $C_{1-12}$ alkyl; and x is in the range of 2 to 10, preferably in the range of 2 to 3. The resulting oligomer or polymer contains one unreacted A functional group and $(x-1)_{n+1}$ number of unreacted B functional end groups, wherein n is the degree of polymerization, which varies from 2 to 1000, preferably 2 to 100. The dendritic oligomers or polymers can be additionally modified by copolymerization with the comonomers, such as lactones, hydroxycarboxylic acids, lactams, aminoacids, cyclic ethers and monomers of the general formula $R''—Z_m$, where R'' is $C_{1-200}$ hydrocarbyl, Z is hydroxyl, amine, epoxy or carboxyl and m varies from 1 to 10, preferably 2 to 6. Examples of suitable comonomers of the general formula $R''—Z_m$ include dimethylolpropionic acid, caprolactone, caprolactam, pentaerythritol, glycerine, neopentyl glycol, trimethylol propane, cyclodextrine, cyclohexanedimethanol, sorbitol, and hydrogenated bisphenol A. The structured reactive diluent formed by this process is shown below:

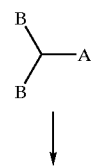

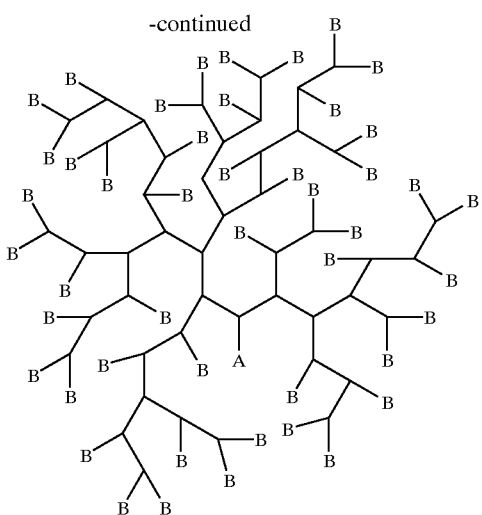

The foregoing materials also exhibit dramatically reduced intermolecular entanglement relative to conventional polyesters.

Still another suitable structured reactive diluent includes torus-shaped structured compounds resulting from α-, β- or γ-cyclodextin. Cyclodextin (cycloamyloses) are torus-shaped cyclic oligosaccharides containing six, seven eight or more α-1,4-linked (+)-D-glucopyranose units. These derivatives are produced enzymatically from starch and are used on an industrial scale. β-Cyclodextrin comprised of seven repeat units, has seven primary and 14 secondary hydroxyl groups located externally on the ring system. The figures shown below show such structures:

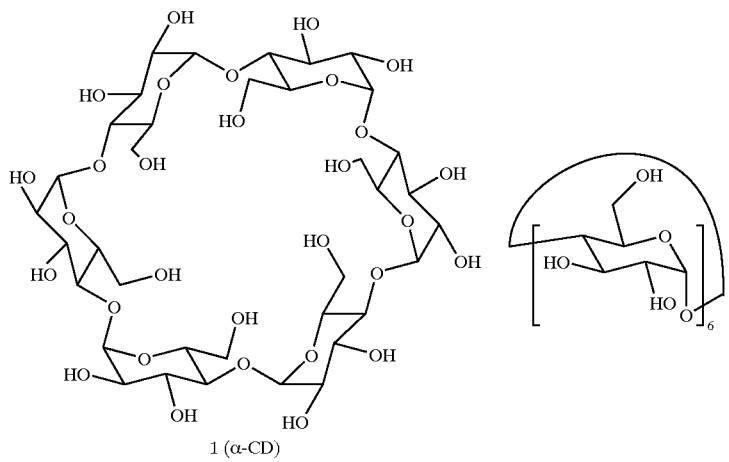

1 (α-CD)

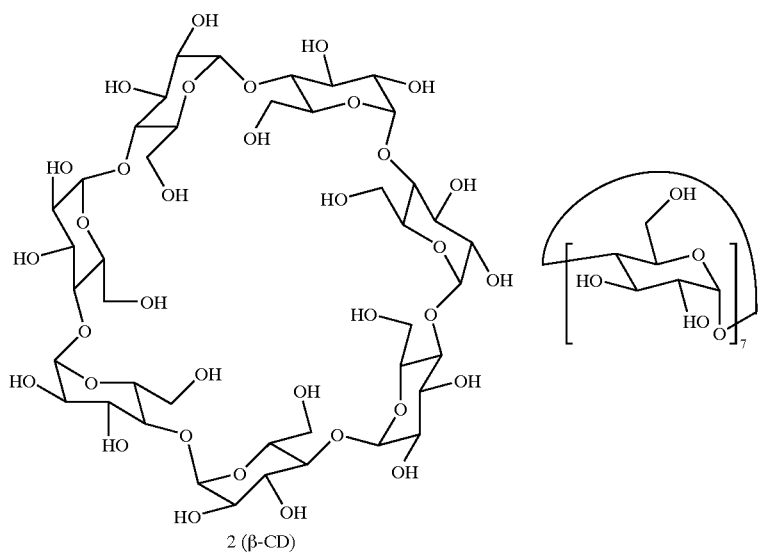

2 (β-CD)

-continued

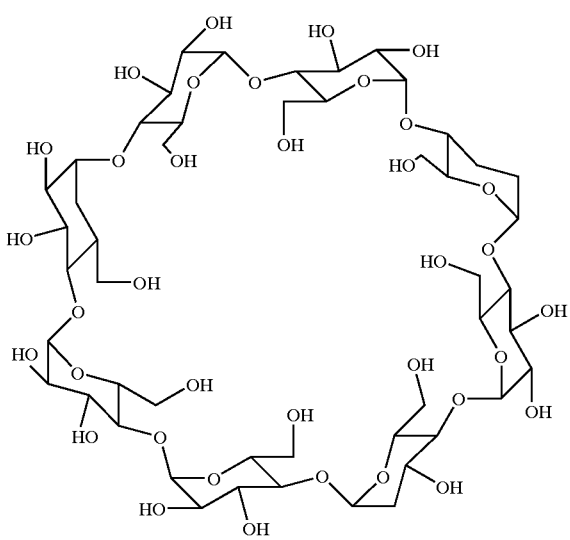

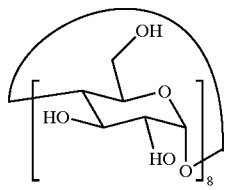

(III)

The hydroxyl groups on these cyclodextrins are reacted with an acetoacetate compound to produce the torus-shaped structured reactive diluent. The incorporation of the cyclodextrin framework into cross-linked networks imparts desired physical and chemical properties to the coatings resulting therefrom. Additional information is provided by M. L. Bender et al. In "Cyclodextrin Chemistry," Springer-Verlag; Berlin, 1978, which is incorporated herein by reference. Additional information on properties of cyclodextrin is also provided in the Journal of Chemical Reviews, volume 98(5), 1998, which is incorporated herein by reference.

If desired, the binder component of the coating composition of the present invention further includes at least one polymer binder selected from the group consisting of acrylic polymer, polyester, or a combination thereof. An acetoacetate containing acrylic polymer, an acetoacetate containing polyester or a combination thereof is preferred and the acetoacetate containing polyester is more preferred. The coating composition may include in the range of from 1 percent to 75 percent, preferably in the range of from 5 percent to 55 percent and more preferably in the range of from 10 percent to 40 percent of the binder polymer, the percentages being in weight percentages based on the total weight of resin solids. When used as a combination of the acrylic polymer and polyester, the binder component includes in the range of from 1 percent to 99 percent, preferably in the range of from 1 percent to 70 percent and more preferably in the range of from 1 percent to 50 percent of the polyester, all percentages being in weight percentage based on the total weight of the combination.

The acrylic polymer has a GPC weight average molecular weight in the range of from 1000 to 50,000, preferably in the range of from 1000 to 20,000 and more preferably in the range of from 5000 to 15,000. The acrylic polymer has a glass transition temperature (Tg) in the range of from −80° C. to 150° C., preferably in the range of from −60° C. to 100° C. and more preferably in the range of from −10° C. to 70° C.

The acrylic polymer has a weight average molecular weight of at least about 1000, as determined by gel permeation chromatography using a polystyrene standard. Typically the weight average molecular weight ranges from about 1000 to about 50,000, preferably from about 2000 to about 30,000 and more preferably from about 5000 to about 15,000. The acetoacetate containing polyester has an acetoacetate equivalent weight from about 100 to about 2000 (grams/equivalents), preferably from about 200 to about 1500 and more preferably from about 300 to about 1000.

Examples of suitable acetoacetate groups-containing acrylic polymers that may be used according to the invention include addition polymers, 4 to 100% by weight of which consists of an acetoacetic ester of a hydroxyalkyl (meth) acrylate or allyl alcohol monomer unit, 0.001% to 96% by weight of an acrylic or methacrylic ester of a mono-, di- or polyfunctional hydroxyl compound having 1 to 18 carbon atoms, 0.001% to 20% by weight of a monoethylenically unsaturated mono- or dicarboxylic acid having 3 to 12 carbon atoms or an anhydride thereof, and 0.001% to 96% by weight of one or more other copolymerizable monomers, such as styrene, α-methyl styrene, vinyl toluene, acrylamide, methacrylamide, acrylonitrile, N-methylol methylol acrylamide, dimethyl maleinate, vinyl acetate, vinyl versatate, vinyl trimethoxy silane and/or allyl glycidyl ether. Suitable monomer units having one or more acetoacetate groups include compounds of the general formula:

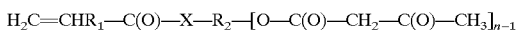

$$H_2C=CHR_1-C(O)-X-R_2-[O-C(O)-CH_2-C(O)-CH_3]_{n-1}$$

where the group $R_1$ represents a hydrogen atom or a methyl group, the group X an oxygen atom or an NH-group and the group $R_2$ is an n-functional organic group having 1 to 26 carbon atoms and n is a number of 2 to 4; the molecular weight of such a monomer unit is generally not higher than 500, preferably 140 to 300. The n-functional organic group $R_2$ may contain urethane groups, ether groups and/or ester groups, for example obtained from a lactone, such as ε-caprolactone, or an epoxy compound or isocyanate compound such as an alkylene oxide, glycidol, a glycidyl ester of a monocarboxylic acid containing 2 to 18 carbon atoms or an adduct of a diisocyanate and a diol. These monomer units are obtained for instance by acetoacetylation of an adduct of a lactone, a monoepoxy compound or a diisocyanate reacted with a diol to a hydroxyallyl (meth)acrylate. Examples of other suitable monomer units include allyl acetoacetate and acetoacetic esters of ethylenically unsaturated diols or triols such as 2-butene-1,4-diacetoacetate and (2-methylene acetoacetyl)-1-propene-3-acetoacetate.

Examples of suitable acrylic or methacrylic esters of a mono-, di- or polyfunctional hydroxyl compound include methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobornyl acrylate, oleyl acrylate, glycidyl methacrylate or (meth)acryloxypropyl trimethoxysilane.

Examples of suitable monoethylenically unsaturated mono- or dicarboxylic acids containing 3 to 12 carbon atoms or an anhydride thereof are acrylic acid, methacrylic acid, maleic acid, itaconic acid, maleic anhydride, cinnamic acid or dodecenic acid.

The acrylic polymers may be prepared in any convenient manner, for instance by polymerizing one or more acetoacetate groups containing monomer, optionally mixed with one or more other monomers, at a temperature of 50° C. to 160° C., in the presence of preferably 0.1 to 10% by weight of an initiator, calculated on the monomeric compound(s). Examples of suitable initiators include free radical initiators, for instance potassium persulphate, hydrogen peroxide, cumene hydroperoxide, benyoyl peroxide, ditert. butyl peroxide, tert. butylpertrimethyl hexanoate, tert. butyl perbenzoate, azobisisobutyronitrile, azobisvaleronitrile, azobis(2,4-dimethylvaleronitrile). The polymerization is carried out in the presence of water and/or an organic solvent, such as a ketone, an alcohol, an ether, an ester or a hydrocarbon. The polymerization may optionally be carried out by using UV light and in the presence of UV initiators, such as benzil, benzoin ethers and thioxanthone derivatives.

Other suitable acetoacetate groups-containing acrylic polymers are addition polymers having, for instance, hydroxyl groups, a number of which have been converted with an acetoacetate compound or a compound yielding acetoacetate groups, such as for instance with diketene. Examples of suitable acetoacetate compounds include alkyl esters of acetylacetic acid, preferably methyl acetoacetate or ethyl acetoacetate. Suitable hydroxyl groups-containing addition polymers include copolymers of a hydroxyalkyl (meth)acrylate such as hydroxyethyl methacrylate, hydroxypropyl methacrylate and/or hydroxybutyl acrylate and optionally one or more other comonomers, and copolymers of styrene and allyl alcohol.

The acetoacetate containing polyester suitable for use in the present invention has a weight average molecular weight of at least about 1000, as determined by gel permeation chromatography using a polystyrene standard. Typically the weight average molecular weight ranges from about 1000 to about 50,000, preferably from about 2000 to about 30,000 and more preferably from about 1000 to about 15,000. The acetoacetate containing polyester has an acetoacetate equivalent weight from about 100 to about 2000 (grams/equivalents), preferably from about 200 to about 1500 and more preferably from about 300 to about 1000.

The acetoacetate containing polyester is prepared as the transesterification reaction product of a polyester polyol and an acetoacetate containing material. The polyester polyol can be prepared by esterification of an organic polycarboxylic acid or anhydride thereof with organic polyol and/or an epoxide. Usually, the polycarboxylic acid or anhydride is an aliphatic or aromatic dibasic acid or acid anhydride and the polyol is a diol.

Examples of diols which are usually employed in preparing the polyester polyol include alkylene glycols, such as ethylene glycol, neopentyl glycol and other glycols, such as cyclohexane diol, bisphenol-A, hydrogenated bisphenol-A, cyclohexanedimethanol, the reaction products of lactones and diols, for example, the reaction product of c-caprolactone and ethylene glycol, hydroxy-alkylated bisphenols, and polyether glycols, for example, poly (oxytetramethylene)glycol.

The acid component of the polyester polyol consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid and tetrachloophthalic acid. Higher polycarboxylic acids, such as trimellitic acid and tricarballylic acid may also be employed.

Suitable polyesters include polyurethane polyols produced by reacting organic polyisocyanates with polyester polyols such as those described above. The organic polyisocyanate is reacted with the polyol so that the OH/NCO equivalent ratio is greater than 1:1 such that there are resultant free hydroxyl groups and an isocyanate equivalent weight approaching 1,000,000. The organic polyisocyanate which is used in preparing the polyurethane polyols can be of varying types but usually is an aliphatic or aromatic polyisocyanate or a mixture thereof is well suited. Diisocyanates are preferred, although higher polyisocyanates such as triisocyanates can be used. Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenyl isocyanates.

The coating composition of the present invention, which is formulated into high solids coating systems further contains at least one organic solvent typically selected from the group consisting of aromatic hydrocarbons, such as petroleum naphtha or xylenes; ketones, such as methyl amyl ketone, methyl isobutyl ketone, methyl ethyl ketone or acetone; esters, such as butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder. The amount of organic solvent used in the present invention results in the composition having a VOC of less than 0.6 kilogram (5 pounds per gallon) and preferably in the range of 0.012 kilogram to 0.528 kilogram (0.1 pounds to 4.4 pounds per gallon), more preferably in the range of from 0.12 kilogram to 0.42 kilogram (1.0 to 3.5 pounds per gallon) of organic solvent per liter of the composition. The solids level of the coating of the present invention varies in the range of from 5 percent to 100 percent, preferably in the range of from 10 percent to 95 percent and more, preferably in the range of from 25 percent to 85 percent, all percentages being based on the total weight of the coating composition.

The coating composition of the present invention may also contain conventional additives, such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended to be used as a clear coating. The foregoing additives may be added to either the binder or crosslinking component, or both, depending upon the intended use of the coating composition.

In use, the binder and crosslinking components of the coating composition are mixed just prior to use or about 5 to 30 minutes before use to form a pot mix, which has limited pot life, in the range of from 10 minutes to 60 minutes, before it becomes too viscous to permit application through conventional application systems, such as spraying. A layer of the pot mix is typically applied to a substrate by conventional techniques, such as spraying, electrostatic spraying, roller coating, dipping or brushing. The layer of the coating composition then cures under ambient conditions in the range of 10 minutes to 3 hours, preferably in the range of 30 minutes to 60 minutes to form a coating on the substrate having the desired coating properties. It is understood that the actual curing time depends upon the thickness of the applied layer and in the presence or absence of any suitable drying devices, such as fans that assist in continuously flowing air over the coated substrate to accelerate the cure rate. Generally, a layer having a thickness in the range of from 25 micrometers to 300 micrometers applied over a metal substrate, such as automotive body, cures in 30 to 60 minutes under ambient conditions and in the absence of any suitable drying devices. If desired, baking the coated substrate at a temperature of about 60° C. for about 30 minutes may further accelerate the cure rate. The foregoing baking step is particularly useful under OEM (Original Equipment Manufacture) conditions.

Testing Procedures

The following test procedures were used for generating data reported in the examples below:

Cure Rate Test

A layer having a dry coating thickness in the range of 58 micrometers to 68 micrometers from a coating composition (at 50% solids level) was applied over a steel panel using a doctor blade and the cure rate of the layer was measured. The change in film hardness of the test layers was measured with respect to time by using a-Persoz hardness tester Model No. 5854 (ASTM D4366), supplied by Byk-Mallinckrodt, Wallingford, Conn. The number of oscillations (referred to as Persoz number) were recorded after 3 hours. The larger the Persoz number, the harder the film will be, thereby demonstrating a faster cure rate of the layer. For the purpose of this invention, a Persoz number of about 80 to 100 after 3 hours dry time for a coating composition is considered acceptable. A Persoz number of about 60 or less is considered not acceptable, since a coating from a primer made therefrom could not be aggressively sanded without fouling the sandpaper after an hour of ambient cure.

Viscosity Measurement

The viscosity of the pot mix of the coating compositions was measured by using the conventional Zahn #2 cup supplied by VWR Scientific Products Corporation. The viscosity was measured as soon as the pot mix was prepared and then 30 minutes thereafter. The reading was recorded as number of seconds it took for the pot mix to drain from the Zahn #2 cup [ASTM D1084 (Method D)]. The lower the Zahn number, the lower is the viscosity of the pot mix. For the purpose of this invention, the Zahn number of about 45 at 30 minute intervals is considered acceptable and the Zahn number of greater than 55 for the same time interval is considered not acceptable.

The invention is illustrated in the following Examples:

EXAMPLES

Structured Reactive Diluent of Example A
Synthesis of Pentaerythritol Tetraacetoacetate (PE/AcAc)

To a glass reactor equipped with a thermometer, stirrer, nitrogen blanket, Vigreux column, condenser, distillation adapter and receiver, Charge-I, shown below was added. The reaction mixture was heated to boiling and 217.6 parts of tert-butyl alcohol were removed by atmospheric distillation (the maximum batch temperature was 180° C.). The acid number of the reaction mire was less than 5. The batch was then cooled to room temperature to give the acetoacetate functional pentaeryiritol as a clear liquid. Gardner-Holdt viscosity=L at 95% solids. Glass transition temperature=−45° C. Analysis of the product by mass spectroscopy (electronspray) indicated a molecular weight equal to 472 g/mol.

| Ingredients-Charge-I | Parts by Weight (grams) |
|---|---|
| Pentaerythritol | 100 |
| Tert-butylacetoacetate | 464.7 |
| Total | 564.7 |

Structured Reactive Diluent of Example B
Structured Tetraacetoacetate Oligomer (PE/MHHPA/Cardura E-10/AcAc)

To a 5-liter flask fitted with an agitator, condenser, heating mantle, nitrogen inlet, thermocouple and an addition port Charge-I, shown below, was added. The mixture was then heated to 140° C. and held for 1 hour. Charge-II, shown below, was then added over a period of 1 hour and held until the acid number of the reaction mixture was less than 2. Charge-III, shown below, was then added and 296 g t-butyl alcohol was removed by distillation. The acid number of the reaction mixture was less than 5. Finally, Charge-IV, shown below, was added and the reaction mixture was stirred for 1 hour and then cooled to room temperature to give a clear solution. Gardner-Holdt viscosity=t+1/2 at 80.5% solids.

| Ingredients | Parts by Weight (grams) |
|---|---|
| Charge-I | |
| Pentaerythritol | 136.0 |
| Methylhexahydrophthalic anhydride | 672.0 |
| Triethylamine | 9.0 |
| Charge-II | |
| Epoxide[1] | 1010 |
| Charge-III | |
| Tert-butylacetoacetate | 633 |
| Charge-IV | |
| 2-Heptanone | 455 |
| Total | 2915.0 |

[1]Cardura ® E-10 is a glycidyl ester of C-10 acid and is available from Shell Chemical Company.

Structured Reactive Diluent of Example C
Structured Tetraacetoacetate Polyester Oligomer (PE/MHHPA/EO/AcAc)

To a vessel rated for high pressure Charge-I, shown below, was added and the batch was heated to 140° C. Charge-II, shown below, was then added over a one hour interval, followed by continued heating for 6 hours. The batch was cooled to 25° C. and Charge III, shown below, was added, and followed by heating at 110° C. for 6 hours. Residual ethylene oxide was removed by purging with nitrogen. The acid number on solids was tested at less than 10 mg KOH/gram. Charge-IV, shown below, was added and the batch was heated to 120° C. and 296 g tert-butylalcohol were removed thereafter during distillation. The acid number of the reaction mixture was less than 5. The mixture cooled to room temperature was a clear solution. Gardner-Holdt viscosity=V+1/2 at 82.7% solids.

| Ingredients | Parts by Weight (grams) |
| --- | --- |
| Charge-I | |
| 2-Heptanone | 303 |
| Pentaerythritol | 136 |
| Triethylamine | 0.23 |
| Charge-II | |
| Methylhexahydrophthalic anhydride[1] | 654 |
| Charge-III | |
| Ethylene oxide | 176 |
| Charge-IV | |
| Tert-butylacetoacetate (TBAA) | 632 |
| Total | 1901.23 |

[1]Milldride ® Methylhexahydrophthalic anhydride supplied by Milliken Chemical Company.

Structured Reactive Diluent of Example D

Hyperbranched Polyester Functionalized with Acetoacetate

To a 2 liter three-neck flask equipped with a mechanical stirrer, thermocouple, short path distillation head with a water condenser under nitrogen flow was placed dimethylolpropionic acid (DMPA, 200 g, 1.49 mole), e-caprolactone (400 g, 3.51 mole), 4,4'-isopropylidenedicyclohexanol (179 g, 0.74 mole), tin(II) di(2-ethylhexanoate) ($Sn(O_2CC_7H_{15})_2$, 3 g, 0.0074 mole), xylenes (20 ml) and heated at 180° C. The reaction progress was monitored by the acid number measurements and by the water volume collected. After 4 hours, 18 ml water was collected, 1 g sample was withdrawn, dissolved in 10 ml DMSO and the acid number (30.6) was determined by titration with 0.1 N KOH in MeOH. The reaction was stopped (heat off) after a total of 10 hours, when the acid number was 1.1 and 23.5 ml water was collected. The polymer had viscosity=5.7 poise for a 90 weight percent solution in butyl acetate at room temperature. Charge-II was added and the mixture was heated to 90° C. during which time tert-butanol was removed by distillation. After the theoretical amount of tert-butanol was collected, the mixture was cooled to room temperature. Unreacted tert-butyl acetoacetate and propylene glycol methyl ether acetate (solvent) was removed by distillation in vacuum, giving the product as viscous oil. Analysis of the product by infrared spectroscopy indicated that the hydroxyl to acetoacetate functional group conversion was in excess of 90%.

| Ingredients | Parts by Weight (grams) |
| --- | --- |
| Charge-I | |
| Dimethylolpropionic acid | 200 |
| ε-caprolactone | 400 |
| 4,4'-isopropylidenedicyclohexanol | 179 |
| tin(II) di(2-ethylhexanoate) | 3 |
| Xylenes | 20 ml |
| Charge-II | |
| Propylene glycolmethyl ether acetate | 1129 |
| Tert-butylacetoacetate (TBAA) | 520 |
| Total | 2451 |

Structured Reactive Diluent of Example E
(β-Cyclodextrin-Acetoacetate)

To a 500-mL flask equipped with a mechanical stirrer, heating mantle and distillation head with a water-cooled condenser was added to charge I. The contents were warmed to 70° C. giving a homogeneous solution. Charge II was then added and the contents of the flask were heated to 85° C. to 90° C. during which time tert-butanol was slowly distilled from the reaction mixture. After collecting 32 g tert-butanol, the mixture was cooled to 30° C. to 40° C. Unreacted tert-butyl acetoacetate and N,N dimethylacetamide were removed by distillation in vacuo, affording a viscous, dark orange oil. Analysis of the product by mass spectroscopy (electronspray) indicated the presence of a distribution of products with a total of 15 to 21 hydroxyl groups on the cyclodextrin ring (out of a maximum of 21) converted to the acetoacetate group.

| Ingredients | Parts by Weight (grams) |
| --- | --- |
| Charge-I | |
| β-cyclodextrin | 30 |
| N,N-dimethylacetamide | 281.1 |
| Charge-II | |
| Tert-butylacetoacetate | 180 |
| Total | 491.1 |

Example F (Acetoacetate Functional Acrylic Polymer)

To a reactor, Charge-I, shown below, was added and the batch was heated to boiling (125° C.) under nitrogen atmosphere. Thereafter, Charge-II, shown below, was added over a period of 210 minutes and starting simultaneously Charge-III, shown below, was added over a period of 270 minutes. The reaction mixture was then held for an additional 60 minutes at boiling after the feeds had been completed. After the hold period, Charge-IV, shown below, was added and the reaction mixture was cooled down to room temperature to produce a clear solution. Gardner-Holdt viscosity=D at 50% solids.

| Ingredients | Parts by Weight (grams) |
| --- | --- |
| Charge-I | |
| Butyl acetate | 273.34 |
| Charge-II | |
| Styrene | 160.92 |
| Acetoacetoxyethyl methacrylate | 201.1 |
| Hydroxyethyl acrylate | 40.2 |
| Butyl acetate | 27 |
| Charge-III | |
| t-butylperoxy acetate | 21.5 (75% solution in mineral spirits) |
| Butyl acetate | 71.87 |
| Charge-IV | |
| Butyl acetate | 30 |
| Total | 825.93 |

Example G (Acetoacetate Functional Polyester)

To a 5-liter reactor equipped with 10" packed separation column, water separator and condenser, Charge-I, shown below, was added while being purged with nitrogen. The reaction batch was gradually heated over 9.5 hours to 230° C., while distilling off 356 g of water from the reaction mixture. The reaction temperature was then reduced to 75° C. and Charge-II, shown below, was added. The reaction temperature was then gradually increased to 140° C. with stirring over s a period of 3 hours while removing 404 g tert-butyl alcohol liquid by distillation. The acid number of the reaction mixture was less than 5. The reaction mixture was then cooled to room temperature to produce a clear solution. Gardner-Holdt viscosity=Y+1/2 at 73.8% solids.

| Ingredients | Parts by Weight (grams) |
| --- | --- |
| Charge-I | |
| Neopentyl glycol | 946.1 |
| Trimethylol propane | 270.4 |
| Isophthalic acid | 787.1 |
| o-Phthalic anhydride | 701.75 |
| Monobutyl tin oxide[1] | 0.7 |
| water | 100 |
| Toluene | 83.68 |
| Charge-II | |
| Xylene | 966.32 |
| TBAA | 817.24 |
| Total | 4673.29 |

[1]FASCAT ® 4100 Monobutyl tin oxide supplied by Elf Atochem.

Examples of Coating Compositions

Coatings from all the examples of coating compositions were applied at 50% solids solutions by weight on cold roll steel panels using a doctor blade to achieve uniform film thickness. Film thickness after drying was in the range 58 to 68 micrometers. Zahn #2 viscosity values for solutions of the coating mixtures were measured at time zero and 30 minutes. Persoz hardness values for the coatings were measured after drying for 3 hours. Comparative examples, shown in Table 1 below, and examples of the present invention, shown in Table 2 below, were prepared by successively mixing of the components shown in Tables 1 and 2 below (All components are in parts by weight):

| Components | Comparative Example 1 | Comparative Example 2 |
| --- | --- | --- |
| Example F (Polyacrylic) | 84.0 | — |
| Example G (Polyester) | — | 20.3 |
| Pentaerythritol tetraacrylate | — | 4.9 |
| Ketimine* | 42.2 | 42.2 |
| Solvent** | 3.7 | 19.7 |
| Measurements | | |
| Zahn #2 (T = 0s) | 30s | 24s |
| Zahn #2(T = 30 min) | gel | 27s |
| Persoz (3h) | 53 | 24 |

*Prepared from 1 mole of Epon ® 828 epoxide and 2 moles epichlorohydrin
**Butyl acetate

| Components | Ex. 1**** | Ex. 2 | Ex. 3 | Ex. 4 | Ex. 5 |
| --- | --- | --- | --- | --- | --- |
| Example F | 16.1 g | 16.1 g | 16.1 g | 59.4 g | 16.1 g |
| Example A | 6.8 g | — | — | — | — |
| Example B | — | 37.4 g | — | — | — |
| Example C | — | — | 22.4g | — | — |
| Example D | — | — | — | 22.8 g | — |
| Example E | — | — | — | — | 13.3g |
| Ketimine* | 42.2 g | 42.2 g | 42.2 g | 42.2 g | 42.2 g |
| Solvent | 10.4** | 4.2** | 18.3** | 17.5** | 17.5*** |
| Measurements | | | | | |
| Zahn #2 (T = 0s) | 20s | 17s | 18s | 30s | 24s |
| Zahn #2 (T = 30 min) | 26s | 21s | 25s | 42s | 41s |
| Persoz (3h) | 120 | 96 | 73 | 64 | 81 |

*prepared from 1 mole diglycidyl ether of Bisphenol A and two moles of the diketimine of dipropylene triamine and methylisobutyl ketone.
**Butyl acetate
***Acetone
****Ex. means Example From Tables 1 and 2 it is seen that by utilizing structured reactive diluents in the coating compositions, unexpectedly significantly faster drying rates, as signified by the Persoz values, are observed. See Examples 1 through 5 in Table 2 as compared to low drying rates observed in Comparative Examples 1 and 2 in Table 1. Furthermore, what is still even more unexpected is Examples 1 through 5 in Table 2 provide faster drying rates than Comparative Examples with no significant rise in the viscosities of the pot mixes made therefrom.

What is claimed is:

1. A coating composition comprising:
   a crosslinking component comprising a polyamine, a polyketimine, or a combination thereof, wherein said polyamine has an average of at least two amine functionalities per polyamine molecule and wherein said polyketimine has an average of at least two ketimine functionalities per polyketimine molecule; and
   a binder component comprising:
   at least one structured reactive diluent having a GPC weight average molecular weight in the range of from 100 to 45,000, said diluent being substantially free from acrylate functionalities and having at least two acetoacetate functionalities per diluent molecule; and
   a binder polymer, which comprises an acrylic polymer, a polyester, or a combination thereof wherein said acrylic polymer or said polyester is functionalized with acetoacetate functionalities.

2. The coating composition of claim 1 wherein said binder polymer has a GPC weight average molecular weight in the range of from 1000 to 50,000.

3. The coating composition of claim 1 wherein said reactive diluent is further provided with at least two cycloaliphatic functionalities.

4. The coating composition of claim 1 wherein said structured reactive diluent comprises in the range of 2 to 30 of said acetoacetate functionalities per said diluent molecule.

5. The coating composition of claim 1 wherein said diluent is a reaction product of an acetoacetate compound with a structured polyol.

6. The coating composition of claim 5 wherein said structured polyol is a star shaped polyol having 3 to 10 arms.

7. The coating composition of claim 6 wherein said star shaped polyol is expanded by reaction with an anhydride or an acid anhydride.

8. The coating composition of claim 1 wherein said diluent is a reaction product of an acetoacetate compound with a dendritic oligomers or polymers.

9. The coating composition of claim 1 wherein said diluent is a reaction product of an acetoacetate compound with a cyclodextrin.

10. The coating composition of claim 1 wherein said polyamine or polyketimine has a GPC weight average molecular weight in the range of from 100 to 50,000.

11. The coating composition of claim 1 wherein said composition comprises in the range of from 25 to 75 percent of said crosslinking component, said percentages being in weight percentages based on the total weight of crosslinking and binder components solids.

12. The coating composition of claim 1 wherein said composition comprises in the range of from 1 to 60 percent of said reactive diluent, said percentages being in weight percentages based on the total weight of crosslinking and binder components solids.

13. The coating composition of claim 1 wherein said composition comprises in the range of from 20 to 80 percent of said binder polymer, said percentages being in weight percentages based on the total weight of crosslinking and binder components solids.

14. The coating composition of claim 1 wherein a volatile organic component content of said composition is in the range of 0.012 kilograms to 0.528 kilograms per liter (0.1 pounds to 4.4 pounds per gallon) of said composition.

15. A method of producing a coating on a substrate, said method comprising:
    mixing a crosslinking component with a binder component to form a pot mix, said crosslinking component comprising a polyamine, a polyketimine, or a combination thereof, said polyamine having an average of at least two amine functionalities per polyamine molecule and said polyketimine having an average of at least two ketimine functionalities per polyketimine molecule; said binder component comprising at least one structured reactive diluent having a GPC weight average molecular weight in the range of from 100 to 45,000, said diluent being substantially free from acrylate functionalities and having at least two acetoacetate functionalities per said diluent molecule; and a binder polymer, which comprises an acrylic polymer, a polyester, or a combination thereof wherein said acrylic polymer or said polyester is functionalized with acetoacetate functionalities;
    applying a layer of said pot mix on surface of said substrate; and
    curing said layer under ambient conditions to form said coating on said surface of said substrate.

16. The method of claim 15 wherein said layer has a thickness in the range of from 25 micrometers to 300 micrometers.

17. The method of claim 16 wherein said layer cures in the range of from 5 minutes to 120 minutes from the said application of said layer on said surface.

18. The method of claim 15 wherein said surface is an automotive body.

19. A coating composition comprising:
    a crosslinking component comprising a polyamine, a polyketimine, or a combination thereof, wherein said polyamine has an average of at least two amine functionalities per polyamine molecule and wherein said polyketimine has an average of at least two ketimine functionalities per polyketimine molecule; and
    a binder component comprising:
    at least one structured reactive diluent having a GPC weight average molecular weight in the range of from 100 to 45,000, said diluent being substantially free from acrylate functionalities, having at least two acetoacetate functionalities per diluent molecule and wherein said structured reactive diluent is a reaction product of an acetoacetate compound with:
    a structured polyol,
    dendritic oligomers or polymers, or
    a cyclodextrin.

20. A method of producing a coating on a substrate, said method comprising:
    mixing a crosslinking component with a binder component to form a pot mix, said crosslinking component comprising a polyamine, a polyketimine, or a combination thereof, said polyamine having an average of at least two amine functionalities per polyamine molecule and said polyketimine having an average of at least two ketimine functionalities per polyketimine molecule; said binder component comprising at least one structured reactive diluent which:
    has a GPC weight average molecular weight in the range of from 100 to 45,000,
    is substantially free from acrylate functionalities,
    has at least two acetoacetate functionalities per said diluent molecule; and
    is a reaction product of an acetoacetate compound with:
    a structured polyol,
    dendritic oligomers or polymers, or
    a cyclodextrin;
    applying a layer of said pot mix on surface of said substrate; and
    curing said layer under ambient conditions to form said coating on said surface of said substrate.

* * * * *